US012371567B2

(12) United States Patent
Oka

(10) Patent No.: US 12,371,567 B2
(45) Date of Patent: Jul. 29, 2025

(54) THERMOSETTING SILICONE COMPOSITION

(71) Applicant: DuPont Toray Specialty Materials Kabushiki Kaisha, Tokyo (JP)

(72) Inventor: Yutaka Oka, Chiba (JP)

(73) Assignee: DuPont Toray Specialty Materials Kabushiki Kaisha, Tokyo (JP)

(*) Notice: Subject to any disclaimer, the term of this patent is extended or adjusted under 35 U.S.C. 154(b) by 226 days.

(21) Appl. No.: 17/388,406

(22) Filed: Jul. 29, 2021

(65) Prior Publication Data

US 2022/0064445 A1    Mar. 3, 2022

(30) Foreign Application Priority Data

Sep. 2, 2020 (JP) .................... 2020-147454

(51) Int. Cl.
*C08L 83/04* (2006.01)
*C08G 77/08* (2006.01)
*C08G 77/12* (2006.01)
*C08G 77/20* (2006.01)

(52) U.S. Cl.
CPC .............. *C08L 83/04* (2013.01); *C08G 77/08* (2013.01); *C08G 77/12* (2013.01); *C08G 77/20* (2013.01); *C08L 2203/20* (2013.01); *C08L 2205/025* (2013.01); *C08L 2205/03* (2013.01)

(58) Field of Classification Search
CPC ......... C08G 77/12; C08G 77/20; C08L 83/04; B01J 23/40
See application file for complete search history.

(56) References Cited

U.S. PATENT DOCUMENTS

| | | | | |
|---|---|---|---|---|
| 5,977,226 A | * | 11/1999 | Dent ..................... | C08G 77/32 524/786 |
| 6,124,407 A | * | 9/2000 | Lee ...................... | C08L 83/04 524/588 |
| 9,403,982 B2 | | 8/2016 | Fujisawa et al. | |
| 9,464,211 B2 | | 10/2016 | Miyamoto et al. | |
| 9,546,309 B2 | | 1/2017 | Miyamoto et al. | |
| 10,172,781 B2 | | 1/2019 | Fryfogle et al. | |
| 10,266,693 B2 | | 4/2019 | Kihara et al. | |
| 11,034,815 B2 | | 6/2021 | Endo et al. | |
| 2012/0065343 A1 | * | 3/2012 | Bahadur ............... | C08L 83/04 525/478 |
| 2020/0115603 A1 | * | 4/2020 | Yamazaki ........... | C09D 183/04 |

FOREIGN PATENT DOCUMENTS

| | | | | | |
|---|---|---|---|---|---|
| JP | 2005158762 | A | | 6/2005 | |
| JP | 2009235265 | A | | 10/2009 | |
| JP | 2011009346 | A | | 1/2011 | |
| JP | 2013209454 | A | | 10/2013 | |
| JP | 2014051606 | A | | 3/2014 | |
| JP | 2014185229 | A | * | 10/2014 | ............. C08L 83/07 |
| JP | 2016186061 | A | | 10/2016 | |
| JP | 2017523283 | A | | 8/2017 | |
| JP | 2017160453 | A | | 9/2017 | |
| JP | 6316592 | B2 | * | 4/2018 | ............. C08L 83/07 |
| JP | 2018519380 | A | | 7/2018 | |
| JP | 2018119167 | A | | 8/2018 | |
| JP | 2020132789 | A | | 8/2020 | |
| TW | 202012543 | A | * | 4/2020 | ............. C08G 77/08 |
| WO | 01040354 | A1 | | 6/2001 | |
| WO | WO-2007086987 | A1 | * | 8/2007 | ........... C08K 5/5425 |
| WO | 2014129347 | A1 | | 8/2014 | |
| WO | 2018097125 | A1 | | 5/2018 | |
| WO | 2019003995 | | * | 1/2019 | |

OTHER PUBLICATIONS

Freeman (Silicones, Published For The Plastics Institute, ILIFFE Books, Ltd., 1962).*
Machine translation of JP-2014185229-A, translation generated Nov. 2023, 11 pages. (Year: 2023).*
Supplier list for the compound tris[(1,1-dimethyl-2-propynyl)oxy]methylsilane, 3 pages. (Year: 2024).*
Machine translation of JP-6316592-B2, translation generated Jan. 2025, 12 pages. (Year: 2025).*
Machine translation of TW-202012543-A, translation generated Jan. 2025, 18 pages. (Year: 2025).*
English language abstract and machine-assisted English translation for JP 2016-186061 A extracted from espacenet. com database on Aug. 4, 2021, 34 pages.
English language abstract for JP 2017-523283 A extracted from espacenet.com database on Aug. 4, 2021, 2 pages.
English language abstract and machine-assisted English translation for JP 2017-160453 A extracted from espacenet.com database on Aug. 4, 2021, 24 pages.
English language abstract for JP 2018-119167 A extracted from espacenet.com database on Aug. 4, 2021, 1 page.
English language abstract for JP 2005-158762 A extracted from espacenet.com database and machine-assisted English translation extracted from JPO database on Jun. 13, 2024, 49 pages.
English language abstract for JP 2009-235265 A extracted from espacenet.com database and machine-assisted English translation extracted from JPO database on Jun. 13, 2024, 43 pages.

(Continued)

*Primary Examiner* — Robert S Loewe
(74) *Attorney, Agent, or Firm* — Howard & Howard Attorneys PLLC

(57) ABSTRACT

A thermosetting silicone composition provides excellent adhesiveness and durability even when cured in a short period of time. The thermosetting silicone composition comprises (A) a polyorganosiloxane having at least two alkenyl groups at both ends of the molecular chain, (B) a resinous organopolysiloxane having at least two alkenyl groups at the end of the molecular chain, (C) a polyorganosiloxane having at least two silicon atom-bonded hydrogen atoms at the side chain of the molecular chain, and (D) a curing reaction catalyst.

20 Claims, No Drawings

(56) References Cited

OTHER PUBLICATIONS

English language abstract for JP 2011-009346 A extracted from espacenet.com database and machine-assisted English translation extracted from JPO database on Jun. 13, 2024, 30 pages.
English language abstract for JP 2013-209454 A extracted from espacenet.com database on Jun. 13, 2024, 2 pages.
English language abstract for JP 2014-051606 A extracted from espacenet.com database on Jun. 13, 2024, 2 pages.
English language abstract for JP 2020-132789 A extracted from espacenet.com database and machine-assisted English translation extracted from JPO database on Jun. 13, 2024, 27 pages.
English language abstract for JP 2018-519380 A extracted from espacenet.com database on Sep. 10, 2024, 1 page.
English language abstract and machine-assisted English translation for WO 2014/129347 A1 extracted from espacenet.com database on Sep. 10, 2024, 15 pages.
English language abstract for WO 2018/097125 A1 extracted from espacenet.com database on Sep. 10, 2024, 2 pages.

\* cited by examiner

THERMOSETTING SILICONE COMPOSITION

CROSS REFERENCE TO RELATED APPLICATION

The present application claims priority to and all the benefits of Japanese Application No. 2020-147454 filed on Sep. 2, 2020, which is hereby expressly incorporated herein by reference in its entirety.

TECHNICAL FIELD

The present disclosure relates to a thermosetting silicone composition. In more detail, the present disclosure relates to a disclosure of a thermosetting silicone composition exhibiting high adhesion properties under a short-time curing condition. The present disclosure also relates to an encapsulant comprising said composition, and to an optical semiconductor device sealed with said encapsulant.

BACKGROUND ART

Silicone compositions are used in a wide range of industrial fields because they have excellent thermal stability and photostability as compared to organic compounds having organic functional groups such as epoxy groups. A curable silicone composition that cures by a hydrosilylation reaction is widely used in electrical and electronic applications because of its excellent heat resistance, cold resistance, and electrical insulation. In particular, silicone compositions are used to bond optical semiconductor devices such as photocouplers, light emitting diodes (LEDs), and solid-state imaging elements.

For example, patent document 1 describes a curable silicone composition for potting or sealing electric and electronic components, the composition at least comprising: (A) an organopolysiloxane having at least two alkenyl groups in one molecule; (B) an organopolysiloxane having at least two silicon atom-bonded hydrogen atoms in one molecule {in such an amount that the silicon atom-bonded hydrogen atom is from 0.5 to 10 mols in this component with respect to 1 mole of alkenyl group in component (A)}; (C) a catalyst for a hydrosilylation reaction (catalytic amount); (D) approximately spherical silica fine powder having an average particle size of 50 µm or less {200 parts by mass or more with respect to 100 parts by mass of the total of components (A) and (B)}; and (E) glass fibers having an average fiber length of 1,000 µm or less and an average fiber diameter of 30 µm or less {25 parts by mass or more with respect to 100 parts by mass of the total of components (A) and (B)}, wherein the total content of components (D) and (E) is 900 parts by mass or less with respect to 100 parts by mass of the total of components (A) and (B).

In addition, patent document 2 describes a silicone elastomer composition having customizable functional characteristics, comprising A) a pituitous silicone fluid and B) a silicone elastomer, wherein: A) the pituitous silicone fluid comprises (1) a hydrosilylation reaction product and (2) a carrier fluid; (1) the hydrosilylation reaction product is a reaction product between (a) a first linear organopolysiloxane and (b) a second linear organopolysiloxane; (a) the first linear organopolysiloxane includes the $(R^1R^2R^3SiO_{1/2})$ unit and the $(R^4R^5SiO_{2/2})$ unit (in the formulas, $R^1$ to $R^5$ are each independently a hydrocarbon group as long as at least one of $R^1$ to $R^5$ is an alkenyl group); (a) the first linear organopolysiloxane includes less than 1 weight percent of T and Q units; (a) the first linear organopolysiloxane has a degree of polymerization of from 100 to 15,000; (b) the second linear organopolysiloxane includes the $(R^6R^7R^8SiO_{1/2})$ unit and the $(R^9R^1SiO_{2/2})$ unit (in the formula, $R^6$ to $R^{10}$ are each independently a hydrocarbon group, polyether group, siloxane group, or polyol group, as long as at least one of $R^6$ to $R^{10}$ is a hydrogen atom); (b) the second linear organopolysiloxane includes less than 1 weight percent of T and Q units; (b) the second linear organopolysiloxane has a degree of polymerization of from 4 to 1,000; (2) the carrier fluid is selected from a silicone fluid, an organic solvent, an organic oil, and combinations thereof; (1) the hydrosilylation reaction product comprises an alkenyl group or an Si—H functional group; (1) the hydrosilylation reaction product is present in an amount of from 3 to 30 parts by weight per 100 parts by weight of A) the pituitous silicone fluid; A) the pituitous silicone fluid exhibits an increasing normal stress observed in a perpendicular direction when a constantly increasing shear force is applied; and B) the silicone elastomer is different from (1) the hydrosilylation reaction product.

Moreover, patent document 3 describes a phosphor-containing silicone composition which is obtained by a hydrosilylation reaction of (a) a polysiloxane having a hydrosilyl group and/or an alkenyl group, (b) a compound having an alkenyl group or a hydrosilyl group that can undergo a hydrosilylation reaction with component (a), and, if necessary, (a') an organic silicon compound having one alkenyl group or hydrosilyl group in one molecule, in the presence of a phosphor.

Furthermore, patent document 4 describes a curable resin composition comprising (A) an organic acid having at least two polar groups in the molecule, (B) a polysiloxane composition and (C) a hydrosilylation catalyst.

PRIOR ART DOCUMENTS

Patent Documents

[Patent document 1] Japanese Unexamined Patent Publication No. 2018-119167
[Patent Document 2] Japanese Translation of PCT International Application Publication No. 2017-523283
[Patent document 3] Japanese Unexamined Patent Publication No. 2017-160453
[Patent document 4] Japanese Unexamined Patent Publication No. 2016-186061

SUMMARY OF THE INVENTION

Problem to be Solved by the Invention

When the silicone composition is used as an encapsulant for optical semiconductor devices such as LEDs, it is required to adhere to a plurality of materials such as metals and organic resins in order to realize high durability. Silicone products used in this application are usually obtained by an addition reaction of a curable silicone composition by heating.

However, a typical silicone product obtained by curing by an addition reaction has the problem that the adhesiveness is low and a long time is required for curing. Further, the silicone product obtained by curing the conventional curable silicone composition in a short period of time has not been able to exhibit sufficient durability under high temperature and high humidity conditions. Therefore, there has been the problem that a curable silicone composition needs to be cured over a long period of time in order to obtain a silicone product having sufficient durability.

An objective of the present disclosure is to provide a thermosetting silicone composition capable of providing a cured product exhibiting excellent adhesiveness and durability under high temperature and high humidity even when the composition is cured in a short period of time.

Another objective of the present disclosure is to provide an encapsulant including the thermosetting silicone composition of the present disclosure. Yet another objective of the present disclosure is to provide an optical semiconductor device that is sealed with the encapsulant of the present disclosure.

Means for Solving the Problems

In order to solve the abovementioned problems, the present inventors carried out extensive studies, and as a result, surprisingly, they have found out that by combining a linear organopolysiloxane capped at both ends of the molecular chain with alkenyl groups, a resinous organopolysiloxane having at least two alkenyl groups at the end of the molecular chain, and an organohydrogenpolysiloxane having at least two silicon atom-bonded hydrogen atoms at the side chain of the molecular chain, a thermosetting silicone composition capable of forming a cured product having sufficient durability even when cured for a short period of time can be provided, and hence they arrived at the present disclosure.

Accordingly, the present disclosure relates to a thermosetting silicone composition comprising (A) a linear organopolysiloxane capped at both ends of the molecular chain with alkenyl groups, (B) a resinous organopolysiloxane having at least two alkenyl groups at the end of the molecular chain, (C) an organohydrogenpolysiloxane having at least two silicon atom-bonded hydrogen atoms at the side chain of the molecular chain, and (D) a curing reaction catalyst.

The organohydrogenpolysiloxane of component (C) is preferably linear.

The linear organopolysiloxane of component (A) which is capped at both ends of the molecular chain with alkenyl groups is preferably represented by the structural formula: $R^1R^2_2SiO(R^2_2SiO)_nSiR^1R^2_2$ (in the formula, $R^1$ is an alkenyl group, $R^2$ are each independently a monovalent hydrocarbon group other than alkenyl groups, and n is an integer of from 5 to 1500).

The resinous organopolysiloxane of component (B) which has at least two alkenyl groups at the end of the molecular chain preferably comprises a siloxane unit represented by $RSiO_{1/2}$ and a siloxane unit represented by $RSiO_{4/2}$.

The present disclosure also relates to an encapsulant comprising the curable silicone composition according to the present disclosure.

The present disclosure also relates to an optical semiconductor device that is sealed with the encapsulant according to the present disclosure.

Effects of the Invention

A cured product obtained by heating the thermosetting silicone composition according to the present disclosure for a short period of time, 10 minutes for example, thereby curing the same, has excellent adhesion characteristics and durability under high humidity and high temperature conditions.

MODE FOR CARRYING OUT THE INVENTION

Thermosetting Silicone Composition

The thermosetting silicone composition according to the present disclosure comprises (A) a linear organopolysiloxane capped at both ends of the molecular chain with alkenyl groups, (B) a resinous organopolysiloxane having at least two alkenyl groups at the end of the molecular chain, (C) an organohydrogenpolysiloxane having at least two silicon atom-bonded hydrogen atoms at the side chain of the molecular chain, and (D) a curing reaction catalyst.

The components of the thermosetting silicone composition of the present disclosure are described in detail below.

(A) Linear Organopolysiloxane Capped at Both Ends of the Molecular Chain with Alkenyl Groups The component (A) is a linear organopolysiloxane capped at both ends of the molecular chain with alkenyl groups.

The component (A) may comprise one type of a linear organopolysiloxane capped at both ends of the molecular chain with alkenyl groups or may comprise two or more types of a linear organopolysiloxane capped at both ends of the molecular chain with alkenyl groups.

The linear organopolysiloxane of component (A) which is capped at both ends of the molecular chain with alkenyl groups is preferably represented by the structural formula (I): $R^1R^2_2SiO(R^2_2SiO)_nSiR^1R^2_2$, and in formula (I), $R^1$ is an alkenyl group, $R^2$ are each independently a monovalent hydrocarbon group other than alkenyl groups, and n is an integer of from 5 to 1500.

Examples of alkenyl groups of $R^1$ in formula (I) include C2-12 alkenyl groups such as vinyl, allyl, butenyl, pentenyl, hexenyl, heptenyl, octenyl, nonenyl, decenyl, undecenyl, and dodecenyl groups, where C2-6 alkenyl groups are preferred, and vinyl groups are particularly preferred.

Examples of monovalent hydrocarbon groups other than alkenyl groups represented by $R^2$ in formula (I) include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms, where C1-6 alkyl groups are preferred, and methyl groups are particularly preferred.

n in formula (I) is preferably 10 or more, more preferably 25 or more, even more preferably 50 or more, preferentially 100 or more, particularly preferably 300 or more. In addition, in formula (I), n is preferably 1200 or less, more preferably 1000 or less, even more preferably 800 or less, preferentially 750 or less, and particularly preferably 700 or less.

The content of the alkenyl group in the entire silicon atom-bonded functional group of component (A) is not particularly limited, and for example this may be 0.01 mol % or more, preferably 0.05 mol % or more, more preferably 0.1 mol % or more, even more preferably 0.15 mol % or more with respect to the total amount of the silicon atom-bonded functional group. The content of the alkenyl group in the entire silicon atom-bonded functional group of component (A) is for example 5 mol % or less, preferably 3 mol % or less, more preferably 1 mol % or less, even more preferably 0.5 mol % or less. The number of alkenyl groups can be determined by means of an analysis technique such as Fourier transform infrared spectrophotometry (FT-IR) or nuclear magnetic resonance (NMR), or by means of a titration method described below.

A method for determining the alkenyl group amount in the components by means of titration will be described. The alkenyl group content in the organopolysiloxane components can be accurately quantified by means of a titration method generally known as the Wijs method. The principle will be described below. Firstly, an alkenyl group in the organopolysiloxane starting material and iodine monochloride are subjected to an addition reaction as shown in formula (1). Next, according to the reaction shown in formula (2), an excess amount of iodine monochloride is reacted with potassium iodide, thereby freeing iodine. The freed iodine is subjected to titration with a sodium thiosulfate solution.

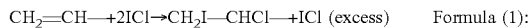
$$CH_2=CH-+2ICl\rightarrow CH_2I-CHCl-+ICl \text{ (excess)} \quad \text{Formula (1):}$$

$$ICl+KI\rightarrow I_2+KCl \quad \text{Formula (2):}$$

The alkenyl group amount in the component can be quantified from the difference between the amount of sodium thiosulfate required for titration and the titration amount of the blank solution prepared separately.

The amount of the linear organopolysiloxane capped at both ends of the molecular chain with alkenyl groups of component (A) is not particularly limited, but the component is included in an amount of preferably 20 mass % or more, more preferably 30 mass % or more, even more preferably 40 mass % or more, preferentially 50 mass % or more, particularly preferably 60 mass % or more, based on the total mass of all the organopolysiloxane components included in the thermosetting silicone composition according to the present disclosure. In addition, the content of the linear organopolysiloxane capped at both ends of the molecular chain with alkenyl groups of component (A) is included, for example, in an amount of 90 mass % or less, preferably 80 mass % or less, more preferably 75 mass % or less, even more preferably 70 mass % or less, based on the total mass of all the organopolysiloxane components.

(B) Resinous Organopolysiloxane Having at Least Two Alkenyl Groups at the End of the Molecular Chain Component (B) is a resinous organopolysiloxane having at least two alkenyl groups at the end of the molecular chain. In the present specification, the resinous organopolysiloxanes refer to organopolysiloxanes that have a branched or network structure in the molecular structure. Component (B) may comprise one type of a resinous organopolysiloxane having at least two alkenyl groups at the end of the molecular chain, or may comprise a combination of two or more types of resinous organopolysiloxane having at least two alkenyl groups at the end of the molecular chain.

In one embodiment, the resinous organopolysiloxane of component (B) contains at least one siloxane unit (unit Q) represented by $RSiO_{4/2}$ in its molecular structure. The resinous organopolysiloxane of component (B) may contain at least one siloxane unit (unit T) represented by $RSiO_{3/2}$ in the molecular structure thereof, but it is preferably free from the T unit. According to a specific embodiment of the present disclosure, the resinous organopolysiloxane of component (B) may be an MQ resin which comprises a siloxane unit (unit M) represented by $RSiO_{1/2}$ and a siloxane unit (unit Q) represented by $RSiO_{4/2}$.

The resinous organopolysiloxane of component (B) is preferably represented by the average unit formula (II):
$(R^3_3SiO_{1/2})_a(R^3_2SiO_{2/2})_b(R^3SiO_{3/2})_c(SiO_{4/2})_d(XO_{1/2})_e$,
where in formula (II), $R^3$ are each independently a monovalent hydrocarbon group, while at least two of $R^3$ are alkenyl groups, X is a hydrogen atom or an alkyl group, $0 \leq a < 1$, $0 \leq b < 1$, $0 \leq c < 0.9$, $0 \leq d < 0.9$, $0 \leq e \leq 0.2$, $a+b+c+d=1.0$, and $c+d>0$.

In the above formula (II) of component (B), examples of the monovalent hydrocarbon group of $R^3$ include: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^3$ is selected from among C1-6 alkyl groups, preferably a methyl group, or C2-6 alkenyl groups, preferably a vinyl group.

X in formula (II) of component (B) is a hydrogen atom or an alkyl group. Preferred examples of alkyl groups represented by X include C1-3 alkyl groups, specifically methyl, ethyl, and propyl groups.

In formula (II) of component (B), a is preferably in the range of $0.1 \leq a \leq 0.8$, more preferably in the range of $0.2 \leq a \leq 0.7$, even more preferably in the range of $0.3 \leq a \leq 0.6$. In formula (II) of component (B), b is preferably in the range of $0 \leq b \leq 0.4$, more preferably in the range of $0 \leq b \leq 0.2$, and particularly in the range of $0 \leq b \leq 0.1$. In formula (II) of component (B), c is preferably in the range of $0 \leq c \leq 0.4$, more preferably in the range of $0 \leq c \leq 0.2$, and particularly in the range of $0 \leq c \leq 0.1$. In formula (II) of component (B), d is preferably in the range of $0.1 \leq c \leq 0.8$, more preferably in the range of $0.2 \leq d \leq 0.7$, and even more preferably in the range of $0.3 \leq d \leq 0.6$.

The resinous alkenyl group-containing organopolysiloxane of component (B) includes alkenyl groups in the molecular terminals. That is, the resinous alkenyl group-containing organopolysiloxane of component (B) has an alkenyl group in the siloxane unit represented by $R^3_3SiO_{1/2}$ (unit M) and is free from an alkenyl group in unit D and/or unit T.

The molecular weight of the organopolysiloxane of component (B) is not particularly limited, but, for example, the weight average molecular weight (Mw) may be from 1000 to 100,000 in terms of standard polystyrene. The weight average molecular weight (Mw) can be determined by GPC, for example.

The resinous alkenyl group-containing organopolysiloxane represented by formula (II) of component (B) has at least two alkenyl groups per molecule. The amount of the alkenyl group in the entire silicon atom-bonded functional group of component (B) is not particularly limited, and for example this may be 1 mol % or more, preferably 2 mol % or more, more preferably 4 mol % or more, even more preferably 6 mol % or more with respect to the total amount of the silicon atom-bonded functional group. The content of the alkenyl group in the entire silicon atom-bonded functional group of component (A) is for example 20 mol % or less, preferably 15 mol % or less, more preferably 12 mol % or less, even more preferably 10 mol % or less. The number of alkenyl groups can be determined, for example, by means of an analysis technique such as Fourier transform infrared spectrophotometry (FT-IR) or nuclear magnetic resonance (NMR), or by means of a titration method described below.

The amount of the resinous alkenyl group-containing organopolysiloxane of component (B) is not particularly limited, but the component is included in an amount of preferably 5 mass % or more, more preferably 10 mass % or more, even more preferably 15 mass % or more, preferentially 20 mass % or more, particularly preferably 25 mass % or more, based on the total mass of all the organopolysiloxane components included in the thermosetting silicone composition according to the present disclosure. In addition, the resinous alkenyl group-containing organopolysiloxane of component (B) is included, for example, in an amount of preferably 80 mass % or less, more preferably 70 mass % or less, even more preferably 60 mass % or less, based on the total mass of all the organopolysiloxane components.

(C) Organohydrogenpolysiloxane Having at Least Two Silicon Atom-Bonded Hydrogen Atoms at the Side Chain of the Molecular Chain The thermosetting silicone composition of the present disclosure includes, as a crosslinking agent, an organohydrogenpolysiloxane having at least two silicon atom-bonded hydrogen atoms in one molecule, at the side chain of the molecular chain of component (C).

One type of organohydrogenpolysiloxane or a combination of two or more organohydrogenpolysiloxanes may be used as component (C).

Examples of the molecular structure of the organohydrogenpolysiloxane of component (C) include linear, linear with some branching, branched, cyclic, and three-dimensional network structures, where linear or branched structures are preferred, and a linear structure is more preferred. An organohydrogenpolysiloxane having only one type of structure may be used, or organohydrogenpolysiloxanes having two or more types of structures may be used in combination as component (C).

The silicon atom-bonded hydrogen atoms of component (C) are hydrogen atoms bonded to a silicon atom other than the silicon atoms at the terminals of the organohydrogenpolysiloxane. Examples of the silicon atom-bonded functional group other than hydrogen atoms in component (C) include monovalent hydrocarbon groups, specifically C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in component (C) may also have a small amount of hydroxyl groups or alkoxy groups such as methoxy or ethoxy groups, within the scope of not impairing the objectives of the present disclosure.

In one embodiment, the organohydrogenpolysiloxane of component (C) is preferably represented by structural formula (III): $R^4_3SiO(R^5_2SiO)_m SiR^4_3$, where in formula (III), $R^4$ are each independently a monovalent hydrocarbon group, $R^5$ are monovalent hydrocarbon groups or hydrogen atoms, while at least two $R^5$ are hydrogen atoms in one molecule, and m is an integer of from 3 to 200.

In formula (III) of component (C), examples of the monovalent hydrocarbon group of $R^4$ and $R^5$ include: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms, and C1-6 alkyl groups are preferred, and methyl groups are more preferred.

m in formula (III) is preferably 5 or more, more preferably 10 or more, even more preferably 20 or more, preferentially 30 or more, particularly preferably 40 or more. m in formula (III) is preferably 300 or less, more preferably 200 or less, even more preferably 150 or less, preferentially 100 or less, particularly preferably 75 or less.

The amount of the organohydrogenpolysiloxane of component (C) is not particularly limited, but the component is included in an amount of preferably 0.5 mass % or more, more preferably 1 mass % or more, even more preferably 2 mass % or more, preferentially 3 mass % or more, particularly preferably 4 mass % or more, based on the total mass of all the organopolysiloxane components included in the thermosetting silicone composition according to the present disclosure. The organopolysiloxane of component (C) is, for example, included in an amount of 20 mass % or less, preferably 15 mass % or less, even more preferably 10 mass % or less, further preferably 7 mass % or less, based on the total mass of the organopolysiloxane components.

In another embodiment, the content of organohydrogenpolysiloxane of component (C) can be, for example, an amount resulting in 1.0 to 3.0 mols, preferably 1.5 to 2.5 mols of silicon atom-bonded hydrogen atoms in this component per 1 mol of silicon atom-bonded alkenyl groups in the thermosetting silicone composition. The content of silicon atom-bonded hydrogen atoms in component (C) can be, for example, determined by analysis such as Fourier transform infrared spectrophotometry (FT-IR) or nuclear magnetic resonance (NMR).

In another embodiment of the present disclosure, based on all of the silicon atom-bonded functional groups in the entire composition, the amount of the silicon atom-bonded hydrogen atoms in the entire composition is not particularly limited, but is preferably 0.54 mol % or more, more preferably 0.82 mol % or more. In addition, in another embodiment of the present disclosure, based on the total amount of the silicon atom-bonded functional groups included in the organopolysiloxane components in the thermosetting silicone composition of the present disclosure, the amount of the silicon atom-bonded hydrogen atoms is not particularly limited, but is preferably 0.54 mol % or more, more preferably 0.82 mol % or more.

The thermosetting silicone composition of the present disclosure may include, as a crosslinking agent, an organohydrogenpolysiloxane having silicon atom-bonded hydrogen atoms at the terminals of the molecular chain, other than the organohydrogenpolysiloxane having at least two silicon atom-bonded hydrogen atoms at the side chain of the molecular chain of component (C).

Examples of the molecular structure of the organohydrogenpolysiloxane having silicon atom-bonded hydrogen atoms at the terminals of the molecular chain include linear, linear with some branching, branched, cyclic, and three-dimensional network structures, where linear or branched structures are preferred, and a linear structure is more preferred. One kind or combinations of two or more kinds of branched organohydrogenpolysiloxane having silicon atom-bonded hydrogen atoms at the terminals of the molecular chain may be used.

The linear organohydrogenpolysiloxane having silicon atom-bonded hydrogen atoms at the terminals of the molecular chain is preferably an organohydrogenpolysiloxane capped at both ends of the molecular chain with hydrosilyl groups, and examples include: dimethylpolysiloxane capped at both ends of the molecular chain with dimethylhydrogensiloxy groups, and dimethylsiloxane-methylphenylsiloxane copolymers capped at both ends of the molecular chain with dimethylhydrogensiloxy groups.

The amount of the organohydrogenpolysiloxane capped with hydrosilyl groups is not particularly limited, but the component is included in an amount of preferably 10 mass % or less, more preferably 8.0 mass % or less, even more preferably 4.0 mass % or less, even further preferably 2.0 mass % or less, based on the total mass of all the organopolysiloxane components included in the thermosetting silicone composition according to the present disclosure.

(D) Curing Reaction Catalyst

The thermosetting silicone composition of the present disclosure includes, as component (D), a curing reaction catalyst for curing the organopolysiloxane components. The thermosetting silicone composition according to the present disclosure may comprise one type of curing reaction catalyst (D), or may contain two or more types of curing reaction catalyst (D).

The curing catalyst of component (D) is a catalyst for promoting curing of an addition reaction-type silicone composition which is curable by means of hydrosilylation. Examples of component (D) include platinum catalysts such as chloroplatinic acid, alcohol solution of chloroplatinic acid, platinum-olefin complex, platinum-1,3-divinyl-1,1,3,3-tetramethyldisiloxane complex, and platinum-supporting powder; palladium catalysts such as tetrakis(triphenylphosphine)palladium, and mixtures of triphenylphosphine and palladium black; and rhodium catalysts, and platinum catalysts are particularly preferable.

The blended amount of the curing catalyst of component (D) is a catalytic amount that is needed to cure the thermosetting silicone composition of the present composition, and is not particularly limited, but when a platinum catalyst is used, for example, the amount of platinum metal contained in the platinum catalyst is preferably in the range of 0.01 to 1000 ppm for practical purposes, and is in particular preferably in the range of 0.1 to 500 ppm, by weight unit, in the silicone composition.

Optional components can be blended into the thermosetting silicone composition of the present disclosure within the scope of not impairing the objectives of the present disclosure. Examples of the optional components include an adhesion promoter, silane coupling agents, reaction inhibitors, acetylene compounds, organic phosphorus compounds, vinyl group-containing siloxane compounds, ultraviolet absorbers, sensitizers, photostabilizers, antioxidants, ultraviolet absorbers, antifoaming agents, leveling agents, inorganic fillers, surfactants, tackifiers, mold release agents, metal soaps, agents that impart heat resistance, agents that impart cold resistance, thermally conductive fillers, agents that impart flame retardance, agents that impart thixotropic properties, fluorescent substances, solvents, and the like.

Adhesion Promoter

The thermosetting silicone composition of the present disclosure may include an adhesion promoter. The adhesion promoter is preferably a silicone compound functionalized with an epoxy group or an alkoxy group. Examples of the adhesion promoter include: an organosilane or a linear, branched, or cyclic organosiloxane oligomer of about 4 to 20 silicon atoms, having a trialkoxysiloxy group (for example, trimethoxysiloxy group or triethoxysiloxy group) or trialkoxysilylalkyl group (for example, trimethoxysilylethyl group or triethoxysilylethyl group) and a hydroxyl or alkenyl group (for example, vinyl group or allyl group); an organosilane or a linear, branched, or cyclic organosiloxane oligomer of about 4 to 20 silicon atoms, having a trialkoxysiloxy group or trialkoxysilylalkyl group and a methacryloxyalkyl group (for example, 3-methacryloxypropyl group); an organosilane or a linear, branched, or cyclic organosiloxane oligomer of about 4 to 20 silicon atoms, having a trialkoxysiloxy group or trialkoxysilylalkyl group and an epoxy group-bonded alkyl group (for example, 3-glycidoxypropyl group, 4-glycidoxybutyl group, 2-(3,4-epoxycyclohexyl)ethyl group, or 3-(3,4-epoxycyclohexyl)propyl group); an aminoalkyltrialkoxysilane and epoxy group-bonded alkyltrialkoxysilane reaction product; and an epoxy group-containing ethyl polysilicate. Specific examples include vinyltrimethoxysilane, allyltrimethoxysilane, allyltriethoxysilane, hydrogentriethoxysilane, 3-glycidoxypropyltrimethoxysilane, 3-glycidoxypropyltriethoxysilane, 2-(3,4-epoxycyclohexyl)ethyltrimethoxysilane, 3-methacryloxyproyltrimethoxysilane, 3-methacryloxypropyltriethoxysilane, diethoxymethyl(3-(oxiranylmethoxy)propyl)silane, a reaction product of 3-glycidoxypropyltriethoxysilane and 3-aminopropyltriethoxysilane, a condensation reaction product of methylvinylsiloxane oligomer capped at both ends of the molecular chain with hydroxyl groups and 3-glycidoxypropyltrimethoxysilane, a condensation reaction product of methylvinylsiloxane oligomer capped at both ends of the molecular chain with hydroxyl groups and 3-methacryloxypropyltriethoxysilane, and tris(3-trimethoxysilylpropyl)isocyanurate. The adhesion promoter in the present composition may be a mixture of two or more types of the abovementioned reaction products, preferably mixtures of diethoxymethyl(3-(oxiranylmethoxy)propyl)silane and a condensation reaction product of methylvinylsiloxane oligomer capped at both ends of the molecular chain with hydroxyl groups and 3-methacryloxypropyltriethoxysilane. In the present composition, the ratio of the abovementioned reaction products in the mixture of the adhesion promoter may be at an optional ratio, and for example the ratio of the reaction product of the two types in the mixture of the adhesion promoter may be 1:10 (mass) to 10:1 (mass), more specifically may be 2:1 (mass), 1:1 (mass), or 1:2 (mass). In the present composition, the content of the adhesion promoter is not limited, but is preferably in the range of from 0.1 to 20 parts by mass, more preferably in the range of from 0.2 to 10 parts by mass, with respect to 100 parts by mass of the total amount of the organopolysiloxane components.

Silane Coupling Agent

The thermosetting silicone composition of the present disclosure may include a silane coupling agent. Specific examples of the silane coupling agent include: epoxy group-containing alkoxysilane compounds such as γ-glycidoxypropyltrimethoxysilane, γ-glycidoxypropyltriethoxysilane, and β-(3,4-epoxycyclohexyl)ethyltrimethoxysilane; mercapto group-containing alkoxysilane compounds such as γ-mercaptopropyltrimethoxysilane and γ-mercaptopropyltriethoxysilane; ureido group-containing alkoxysilane compounds such as γ-ureidopropyltriethoxysilane, γ-ureidopropyltrimethoxysilane, and γ-(2-ureidoethyl) aminopropyltrimethoxysilane; isocyanate group-containing alkoxysilane compounds such as γ-isocyanatepropyltriethoxysilane, γ-isocyanatepropyltrimethoxysilane, γ-isocyanatepropylmethyldimethoxysilane, γ-isocyanatepropylmethyldiethoxysilane, γ-isocyanatepropylethyldimethoxysilane, γ-isocyanatepropylethyldiethoxysilane, and γ-isocyanatepropyltrichlorosilane; amino group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane;

and the like. The amount of the silane coupling agent is not particularly limited, but is preferably 2.0 mass % or less based on the total mass of all the organopolysiloxane components included in the thermosetting silicone composition according to the present disclosure.

Reaction Inhibitor

The thermosetting silicone composition of the present disclosure may include a reaction inhibitor in order to suppress the curing reaction. The reaction inhibitor is preferably a compound functionalized with an alkene group or alkylene group. Examples of the reaction inhibitor include: an alkyne alcohol such as 1-ethinylcyclohexan-1-ol, 2-methyl-3-butyn-2-ol, 3,5-dimethyl-1-hexyn-3-ol, or 2-phenyl-3-butyn-2-ol; an enyne compound such as 3-methyl-3-penten-1-yne or 3,5-dimethyl-3-hexen-1-yne; an alkyne oxysilane such as 1,1-dimethylpropynyloxytrimethylsilane (methyl-tris (3-methyl-1-butyn-3-oxy)silane), bis(1,1-dimethylpropynoxy)dimethylsilane, or bis(1,1-dimethylpropynoxy)methylvinylsilane; and benzotriazole. In the present composition, the content of the reaction inhibitor is not limited, but is preferably in the range of from 0.001 to 5 parts by mass, more preferably in the range of from 0.01 to 1 parts by mass, with respect to 100 parts by mass of the total amount of the organopolysiloxane components.

Heat Resistance-Imparting Agent

The thermosetting silicone composition of the present disclosure may include a heat resistance-imparting agent. The heat resistance-imparting agent is not particularly limited, and examples include iron oxide (bengara), cerium oxide, cerium dimethyl silanolate, fatty acid cerium salt, cerium hydroxide, and zirconium compound. The heat resistance-imparting agent is preferably a cerium-containing organopolysiloxane. In the present composition, the content of the heat resistance-imparting agent is not limited, but is preferably in the range of from 0.1 to 20 parts by mass, more preferably in the range of from 0.2 to 10 parts by mass, with respect to 100 parts by mass of the total amount of the organopolysiloxane components.

The thermosetting silicone composition of the present disclosure can be cured in a short period of time, for example, can be cured with heating in a period of less than 10 minutes. The heating temperature for curing the thermosetting silicone composition of the present disclosure is preferably higher than 100° C., more preferably is from 150 to 200° C. Even when the thermosetting silicone composition of the present disclosure is cured in a short period of time, a cured product thereof exhibits excellent adhesiveness and durability under high temperature and high humidity conditions.

The thermosetting silicone composition of the present disclosure can be prepared by mixing the components. The method of mixing the components may be a conventionally known method, and is not particularly limited, and a uniform mixture is usually obtained by simple mixing. In addition, a mixing device may be used for mixing. There are no particular limitations regarding this mixing device, and examples include single- and twin-screw continuous mixers, double roller mixers, Ross mixers, Hobart mixers, dental mixers, planetary mixers, kneader mixers, Henschel mixers, and the like.

Encapsulant

The present disclosure also relates to an encapsulant comprising the thermosetting silicone composition of the present disclosure. The encapsulant of the present disclosure is preferably an encapsulant for optical semiconductors. The configuration of the encapsulant of the present disclosure is not particularly limited, but is preferably in the form of a film or sheet. The present disclosure therefore also relates to a film obtained by solidifying the thermosetting silicone composition of the present disclosure. The film of the present disclosure can be preferably used as an encapsulant in the form of a film for encapsulating a semiconductor element. The semiconductor that is to be sealed with the encapsulant or film of the present disclosure is not particularly limited, and examples include semiconductors of SiC, GaN, etc., for example, or optical semiconductors such as light-emitting diodes.

Conventionally well-known methods may be used as the method for forming the thermosetting silicone composition of the present disclosure in the form of a film or sheet, and examples include the following methods: extruding into a film through an extruder provided with a predetermined base; using calender rolls to sandwich the composition between organic resin films such as polyolefin film and polyester film, thereby forming a uniform film; and molding the composition into a film with a press adjusted to 40° C. or lower. In addition, it is possible to use a calendar roll in order to achieve lamination between organic resin films for continuous molding. The encapsulant in the form of film molded in such a manner can be used by cutting a long roll substance into a required shape with a cutter or a punching machine.

The film thickness of the encapsulant in the form of film or sheet according to the present disclosure is not particularly limited, and is preferably in the range of from 1 µm to 10 mm or from 5 µm to 5 mm.

With the encapsulant of the present disclosure, since it comprises the thermosetting silicone composition of the present disclosure, excellent adhesiveness and durability are provided even under high humidity and high temperature, and a highly reliable semiconductor device can therefore be provided.

Optical Semiconductor Device

In regard to the optical semiconductor device of the present disclosure, an optical semiconductor element is sealed with the encapsulant of the present disclosure. In other words, an optical semiconductor element is sealed, coated, or adhered by means of the encapsulant comprising the thermosetting silicone composition of the present disclosure. Examples of the optical semiconductor element include light-emitting diodes (LED), semiconductor lasers, photodiodes, phototransistors, solid-state imaging, and light emitters and light receivers for photocouplers, and, in particular, light-emitting diodes (LED) are especially preferred.

Light-emitting diodes (LEDs) emit light from the upper, lower, left and right sides of the optical semiconductor element, and so it is undesirable for parts constituting the light-emitting diode (LED) to absorb light, and materials having high light transmittance or high reflectance are preferred for said parts. Consequently, the substrate on which the optical semiconductor element is mounted also preferably comprises a material of high light transmittance or high reflectance. Examples of substrates on which to mount the optical semiconductor element include conductive metals such as silver, gold, and copper; non-conductive metals such as aluminum and nickel; thermoplastic resins mixed with white pigments such as PPA and LCP; thermosetting resins containing white pigments such as epoxy resins, BT resins, polyimide resins, and silicone resins; and ceramics such as alumina and alumina nitride.

Since the optical semiconductor device of the present disclosure is sealed with the encapsulant of the present disclosure that has excellent adhesiveness and durability even under high temperature and high humidity, it is highly reliable.

EXAMPLE

The thermosetting silicone composition of the present disclosure is described in greater detail by means of the following examples and comparative examples.

The starting material components shown below were used in the following examples and comparative examples. Below, Me represents a methyl group, Vi represents a vinyl group. Also, hereinbelow, epoxy group- and/or alkoxy group-functionalized silicone may be a mixture of diethoxymethyl(3-(oxiranylmethoxy)propyl)silane and a condensation reaction product of methylvinylsiloxane oligomer capped at both ends of the molecular chain with hydroxyl groups and 3-glycidoxypropyltrimethoxysilane at 1:1 (mass).

Example 1

Me$_2$ViSiO(Me$_2$SiO)$_{550}$SiMe$_2$Vi: 65 mass %
(Me$_2$ViSiO$_{1/2}$)$_{11}$(Me$_3$SiO$_{1/2}$)$_{34}$(SiO$_{4/2}$)$_{55}$: 30 mass %
Me$_3$SiO(MeHSiO)$_{50}$SiMe$_3$: 5 mass %
Platinum (Pt) catalyst compound: 0.005 parts by mass per 100 parts by mass of the abovementioned organopolysiloxane components
Methyl-tris(3-methyl-1-butyn-3-oxy)silane: 0.05 parts by mass per 100 parts by mass of the abovementioned organopolysiloxane components
Epoxy group- and/or alkoxy group-functionalized silicone: 0.5 parts by mass per 100 parts by mass of the abovementioned organopolysiloxane components Example 2

Me$_2$ViSiO(Me$_2$SiO)$_{550}$SiMe$_2$Vi: 65 mass %
(Me$_2$ViSiO$_{1/2}$)$_6$(Me$_3$SiO$_{1/2}$)$_{36}$(SiO$_{4/2}$)$_{58}$: 30 mass %
Me$_3$SiO(MeHSiO)$_{50}$SiMe$_3$: 5 mass %
Platinum (Pt) catalyst compound: 0.005 parts by mass per 100 parts by mass of the abovementioned organopolysiloxane components
Methyl-tris(3-methyl-1-butyn-3-oxy)silane: 0.05 parts by mass per 100 parts by mass of the abovementioned organopolysiloxane components
Epoxy group- and/or alkoxy group-functionalized silicone: 0.5 parts by mass per 100 parts by mass of the abovementioned organopolysiloxane components Example 3

Me$_2$ViSiO(Me$_2$SiO)$_{550}$SiMe$_2$Vi: 65 mass %
(Me$_2$ViSiO$_{1/2}$)$_{11}$(Me$_3$SiO$_{1/2}$)$_{34}$(SiO$_{4/2}$)$_{55}$: 30 mass %
Me$_3$SiO(MeHSiO)$_{50}$SiMe$_3$: 0.5 mass %
Platinum (Pt) catalyst compound: 0.005 parts by mass per 100 parts by mass of the abovementioned organopolysiloxane components
Methyl-tris(3-methyl-1-butyn-3-oxy)silane: 0.05 parts by mass per 100 parts by mass of the abovementioned organopolysiloxane components
Epoxy group- and/or alkoxy group-functionalized silicone: 0.5 parts by mass per 100 parts by mass of the abovementioned organopolysiloxane components
Cerium-containing organopolysiloxane: 0.5 parts by mass per 100 parts by mass of the abovementioned organopolysiloxane components Comparative Example 1

Me$_2$ViSiO(Me$_2$SiO)$_{550}$SiMe$_2$Vi: 99.5 mass %
Me$_3$SiO(MeHSiO)$_{50}$SiMe$_3$: 0.5 mass %
Platinum (Pt) catalyst compound: 0.005 parts by mass per 100 parts by mass of the abovementioned organopolysiloxane components
3,5-dimethyl-1-hexen-3-ol: 0.05 parts by mass per 100 parts by mass of the abovementioned organopolysiloxane components
Epoxy group- and/or alkoxy group-functionalized silicone: 0.5 parts by mass per 100 parts by mass of the abovementioned organopolysiloxane components Comparative Example 2

Me$_2$ViSiO(Me$_2$SiO)$_{550}$SiMe$_2$Vi: 99.5 mass %
(Me$_2$HSiO$_{1/2}$)$_{62.5}$(SiO$_{4/2}$)$_{37.5}$: 0.5 mass %
Platinum (Pt) catalyst compound: 0.005 parts by mass per 100 parts by mass of the abovementioned organopolysiloxane components
3,5-dimethyl-1-hexen-3-ol: 0.05 parts by mass per 100 parts by mass of the abovementioned organopolysiloxane components
Epoxy group- or alkoxy group-functionalized silicone: 0.5 parts by mass per 100 parts by mass of the abovementioned organopolysiloxane components Adhesion Test The curable silicone compositions of Example 1 to 3 and Comparative Examples 1 and 2 were applied onto glass substrates in an amount of 0.5 g, and were heated for 10 minutes at 200° C. in order to obtain cured products. The resulting cured products were kept under an environment of 85° C. and humidity of 85% for 24 hours, and then presence or absence of peeling between the glass substrate and the cured silicone product was determined. The cured products obtained from the curable silicone compositions of Examples 1 to 3 coagulated and fractured at the interface with the substrate, but the cured products obtained from the curable silicone compositions of Comparative Examples 1 and 2 showed interfacial peeling between the substrate and the material. Accordingly, it was confirmed that the thermosetting silicone composition according to the present disclosure provides excellent adhesiveness and durability even under high temperature and high humidity.

INDUSTRIAL APPLICABILITY

The thermosetting curable silicone composition of the present disclosure is useful as an encapsulant, coating agent, or adhesive agent for optical semiconductor elements such as photoemitters and photodetectors for photocouplers, solid-state imaging, phototransistors, photodiodes, semiconductor lasers, light-emitting diodes (LEDs), etc. Also, the optical semiconductor device of the present disclosure is useful as an optical semiconductor device for optical devices, optical equipment, lighting equipment, and lighting devices, etc.

The invention claimed is:
1. A thermosetting transparent silicone composition comprising:
(A) a linear organopolysiloxane capped at both ends of the molecular chain with alkenyl groups, which is represented by the structural formula:
R$_1$R$^2$$_2$SiO(R$^2$$_2$SiO)$_n$SiR$^1$R$^2$$_2$ (in the formula, R$^1$ is an alkenyl group, R$^2$ are each independently C1-12 alkyl groups, and n is an integer of from 5 to 1500),

(B) a resinous organopolysiloxane having at least two alkenyl groups at the end of the molecular chain, wherein the amount of alkenyl groups in the entire silicon atom-bonded functional group of component (B) is 6 mol % or more with respect to the total amount of the silicon atom-bonded functional group, (C) an organohydrogenpolysiloxane having at least two silicon atom-bonded hydrogen atoms at the side chain of the molecular chain, which is represented by the structural formula:

$R^4_3SiO(R^5_2SiO)_mSiR^4_3$ (in the formula, $R^4$ are each independently C1-12 alkyl groups, $R^5$ are each independently C1-12 alkyl groups or hydrogen atoms, while at least two $R^5$ are hydrogen atoms, and m is an integer of from 3 to 200), (D) a curing reaction catalyst; and (E) a silicone compound functionalized with an epoxy group or an alkoxy group;

wherein component (A) is included in the amount of 60 mass % or more based on the total mass of all the organopolysiloxane component, wherein the content of organohydrogenpolysiloxane of component (C) is 1.0 to 3.0 mols of silicon atom-bonded hydrogen atoms per 1 mol of silicon atom-bonded alkenyl groups in the composition, and wherein the composition further comprises methyl-tris(3-methyl-1-butyn-3-oxy)silane as a reaction inhibitor.

2. The thermosetting transparent silicone composition as claimed claim 1, wherein the resinous organopolysiloxane having at least two alkenyl groups at the end of the molecular chain of component (B) comprises a siloxane unit represented by $SiO_{1/2}$ and a siloxane unit represented by $SiO_{4/2}$.

3. An encapsulant of an optical semiconductor device, being cured material of the thermosetting transparent silicone composition described in claim 1.

4. The thermosetting transparent silicone composition as claimed in claim 1, wherein $R^1$ for component (A) is a C2-6 alkenyl group, each $R^2$ for component (A) is independently a C1-6 alkyl group, and integer n for component (A) ranges from 10 to 1200.

5. The thermosetting transparent silicone composition as claimed claim 1, wherein the resinous organopolysiloxane of component (B) is represented by the average unit formula (II):

$(R^3_3SiO_{1/2})_a(R^3_2SiO_{2/2})_b(R^3SiO_{3/2})_c(SiO_{4/2})_d(XO_{1/2})_e$, where in formula (II), each $R^3$ is independently C1-12 alkyl groups or C2-12 alkenyl groups, while at least two of $R^3$ are alkenyl groups, X is a hydrogen atom or an alkyl group, $0 \le a < 1$, $0 \le b < 1$, $0 \le c < 0.9$, $0 \le d < 0.9$, $0 \le e \le 0.2$, $a+b+c+d=1.0$, and $c+d>0$.

6. The thermosetting transparent silicone composition as claimed claim 5, wherein each $R^3$ for component (B) is independently a C1-6 alkyl group or a C2-C6 alkenyl group, and X for component (B) is a hydrogen atom or a C1-3 alkyl group.

7. The thermosetting Previously Presented transparent silicone composition as claimed claim 5, wherein in formula (II) of component (B), a is in the range of $0.1 \le a \le 0.8$, b is in the range of $0 \le b \le 0.4$, c is in the range of $0 \le c \le 0.4$, and d is in the range of $0.1 \le d \le 0.8$.

8. The thermosetting transparent silicone composition as claimed in claim 1, wherein the composition is free of silica particles.

9. The thermosetting transparent silicone composition as claimed in claim 1, wherein the amount of the silicon atom-bonded hydrogen atoms in the entire composition is 0.82 mol % or more.

10. The thermosetting transparent silicone composition as claimed in claim 9, wherein m in the formula $R^4_3SiO(R^5_2SiO)_mSiR^4_3$ is an integer of from 40 to 200.

11. The thermosetting transparent silicone composition as claimed in claim 1, wherein m in the formula $R^4_3SiO(R^5_2SiO)_mSiR^4_3$ is an integer of from 40 to 200.

12. An optical semiconductor device, which is sealed with a cured material of a thermosetting transparent silicone composition comprising:

(A) a linear organopolysiloxane capped at both ends of the molecular chain with alkenyl groups, which is represented by the structural formula:

$R^1R^2_2SiO(R^2_2SiO)_nSiR^1R^2_2$ (in the formula, $R^1$ is an alkenyl group, $R^2$ are each independently C1-12 alkyl groups, and n is an integer of from 5 to 1500), (B) a resinous organopolysiloxane having at least two alkenyl groups at the end of the molecular chain, wherein the amount of alkenyl groups in the entire silicon atom-bonded functional group of component (B) is 6 mol % or more with respect to the total amount of the silicon atom-bonded functional group, (C) an organohydrogenpolysiloxane having at least two silicon atom-bonded hydrogen atoms at the side chain of the molecular chain, which is represented by the structural formula:

$R^4_3SiO(R^5_2SiO)_mSiR^4_3$ (in the formula, $R^4$ are each independently C1-12 alkyl groups, $R^5$ are each independently C1-12 alkyl groups or hydrogen atoms, while at least two $R^5$ are hydrogen atoms, and m is an integer of from 3 to 200), (D) a curing reaction catalyst, (E) a silicone compound functionalized with an epoxy group or an alkoxy group, and methyl-tris(3-methyl-1-butyn-3-oxy) silane as a reaction inhibitor, wherein the content of organohydrogenpolysiloxane of component (C) is 1.0 to 3.0 mols of silicon atom-bonded hydrogen atoms per 1 mol of silicon atom-bonded alkenyl groups in the composition.

13. The optical semiconductor device as claimed claim 12, wherein the resinous organopolysiloxane of the thermosetting transparent silicone composition which has at least two alkenyl groups at the end of the molecular chain of component (B) comprises a siloxane unit represented by $SiO_{1/2}$ and a siloxane unit represented by $SiO_{4/2}$.

14. The optical semiconductor device as claimed in claim 12, wherein the amount of the silicon atom-bonded hydrogen atoms in the entire composition is 0.82 mol % or more.

15. The optical semiconductor device as claimed in claim 14, wherein m in the formula $R^4_3SiO(R^5_2SiO)_mSiR^4_3$ is an integer of from 40 to 200.

16. The optical semiconductor device as claimed in claim 12, wherein m in the formula $R^4_3SiO(R^5_2SiO)_mSiR^4_3$ is an integer of from 40 to 200.

17. A transparent film obtained by solidifying a thermosetting transparent silicone composition comprising:

(A) a linear organopolysiloxane capped at both ends of the molecular chain with alkenyl groups, which is represented by the structural formula:

$R^1R^2_2SiO(R^2_2SiO)_nSiR^1R^2_2$ (in the formula, $R^1$ is an alkenyl group, $R^2$ are each independently C1-12 alkyl groups, and n is an integer of from 5 to 1500), (B) a resinous organopolysiloxane having at least two alkenyl groups at the end of the molecular chain, wherein the amount of alkenyl groups in the entire silicon atom-bonded functional group of component (B) is 6 mol % or more with respect to the total amount of the silicon atom-bonded functional group, (C) an organohydrogenpolysiloxane having at least two silicon atom-bonded hydrogen atoms at the side chain of the molecular chain, which is represented by the structural formula:
$R^4{}_3SiO(R^5{}_2SiO)_m SiR^4{}_3$ (in the formula, $R^4$ are each independently C1-12 alkyl groups, $R^5$ are each independently C1-12 alkyl groups or hydrogen atoms, while at least two $R^5$ are hydrogen atoms, and m is an integer of from 3 to 200), (D) a curing reaction catalyst, (E) a silicone compound functionalized with an epoxy group or an alkoxy group, and methyl-tris(3-methyl-1-butyn-3-oxy) silane as a reaction inhibitor, wherein the content of organohydrogenpolysiloxane of component (C) is 1.0 to 3.0 mols of silicon atom-bonded hydrogen atoms per 1 mol of silicon atom-bonded alkenyl groups in the composition.

18. The transparent film as claimed in claim 17, wherein the amount of the silicon atom-bonded hydrogen atoms in the entire composition is 0.82 mol % or more.

19. The transparent film as claimed in claim 18, wherein m in the formula $R^4{}_3SiO(R^5{}_2SiO)_m SiR^4{}_3$ is an integer of from 40 to 200.

20. The transparent film as claimed in claim 17, wherein m in the formula $R^4{}_3SiO(R^5{}_2SiO)_m SiR^4{}_3$ is an integer of from 40 to 200.

* * * * *